United States Patent [19]

Agueda et al.

[11] Patent Number: 5,266,216
[45] Date of Patent: Nov. 30, 1993

[54] WATER PURIFICATION APPARATUS AND PROCESS UTILIZING OZONE

[76] Inventors: Stephen R. Agueda, 299 Ramona Dr., San Luis Obispo, Calif. 93405; Thomas C. Ralph, 1381 Old Oak Park Rd., Arroyo Grande, Calif. 93420

[21] Appl. No.: 30,647
[22] Filed: Mar. 12, 1993
[51] Int. Cl.⁵ .............................................. C02F 1/78
[52] U.S. Cl. ................................. 210/760; 210/808; 210/258; 210/259; 210/749; 210/416.1
[58] Field of Search ............... 210/808, 749, 760, 638, 210/258, 259, 261, 96.2, 192, 416.1

[56] References Cited

U.S. PATENT DOCUMENTS

| | | | |
|---|---|---|---|
| 3,805,481 | 4/1974 | Armstrong | 210/96.2 |
| 3,835,039 | 9/1974 | Ciambrone | 210/192 |
| 3,904,521 | 9/1975 | Stopka | 210/192 |
| 4,123,800 | 10/1978 | Mazzei | 366/150 |
| 4,341,641 | 7/1982 | Novak | 210/760 |
| 4,555,335 | 11/1985 | Burris | 210/192 |
| 4,767,528 | 8/1988 | Sasaki et al. | 210/177 |
| 4,780,215 | 10/1988 | Carlson | 210/760 |
| 5,069,880 | 12/1991 | Karlson | 422/186.19 |
| 5,106,497 | 4/1992 | Finnegan | 210/258 |
| 5,145,585 | 9/1992 | Coke | 210/760 |
| 5,178,755 | 1/1993 | La Crosse | 210/760 |
| 5,180,499 | 1/1993 | Hinson et al. | 210/760 |

OTHER PUBLICATIONS

"Triple O Water Treatment System, Model TWTS-10-1—For Purification of Domestic Holding Tank Water", Triple O Systems, Inc., 1992.

Primary Examiner—Robert A. Dawson
Assistant Examiner—Ana M. Fortuna
Attorney, Agent, or Firm—McCubbrey, Bartels, Meyer & Ward

[57] ABSTRACT

A system and a process is disclosed for purifying water with a domestic water holding tank and ozone-air mixture from an ozone generator. A mixer injector connected to a pump which provides the means for entraining the ozone-air stream gas into the water stream is positioned both vertically within the tank and laterally to assure the most efficient purification of the holding tank water.

9 Claims, 3 Drawing Sheets

FIG._1
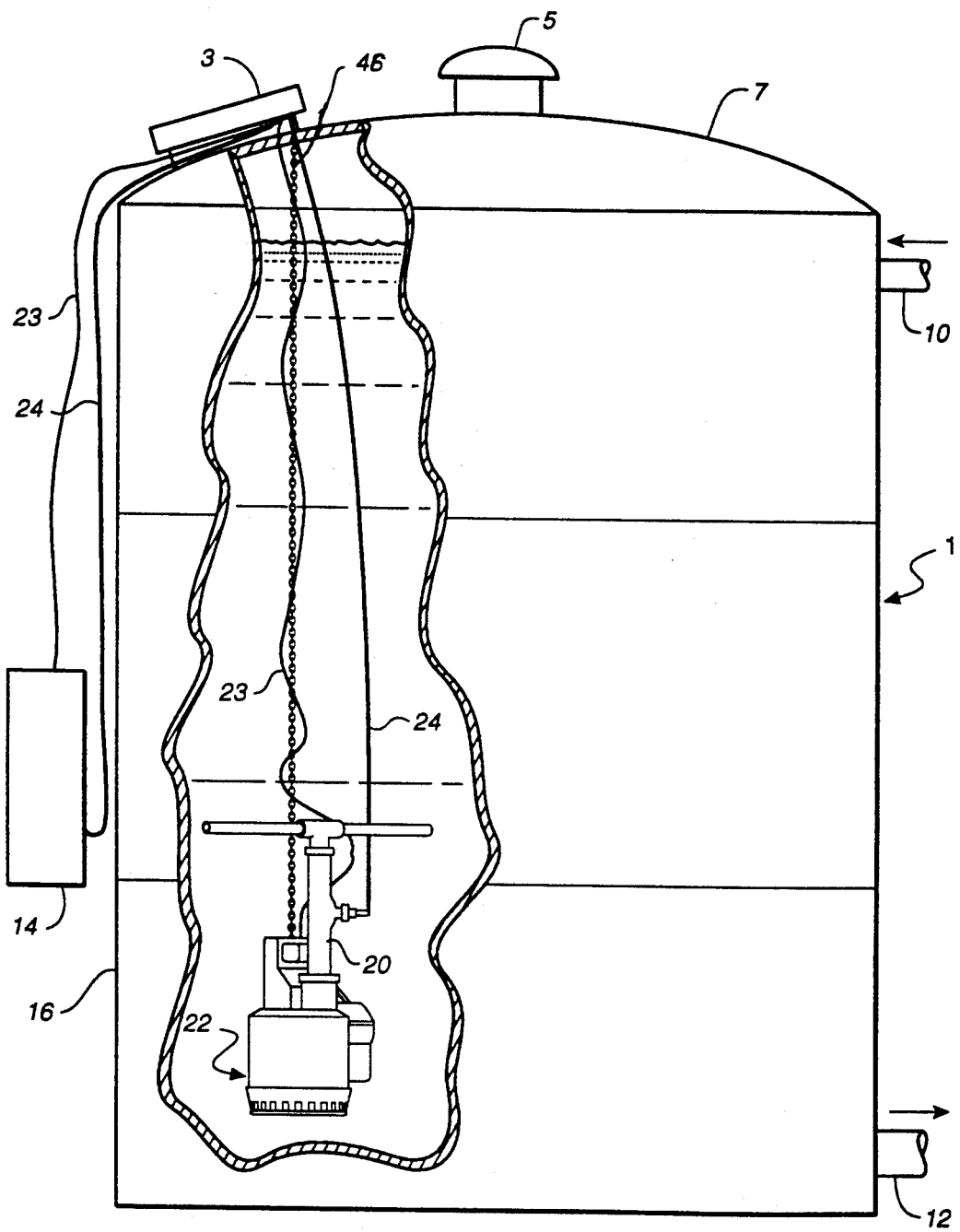

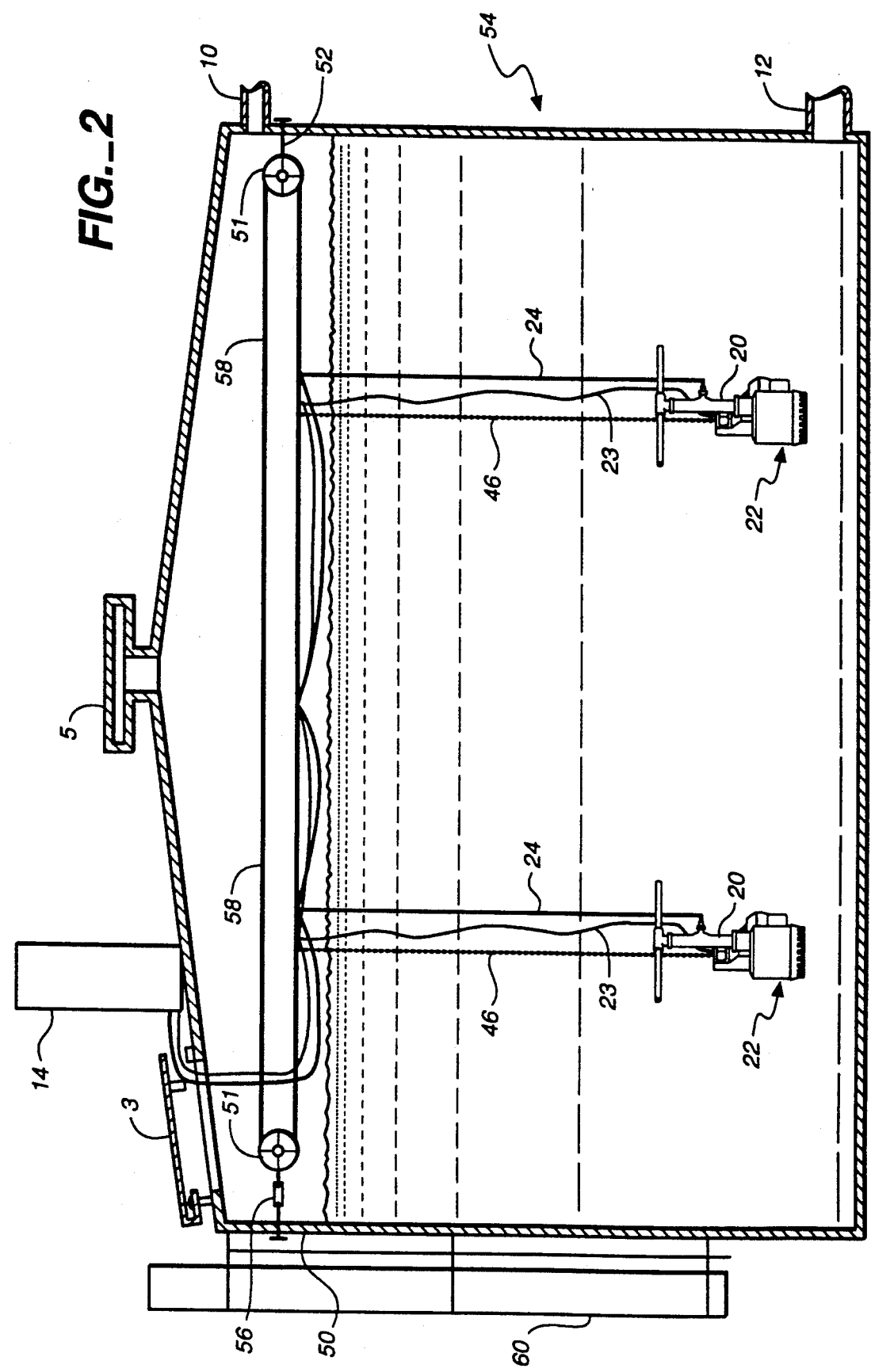
FIG._2

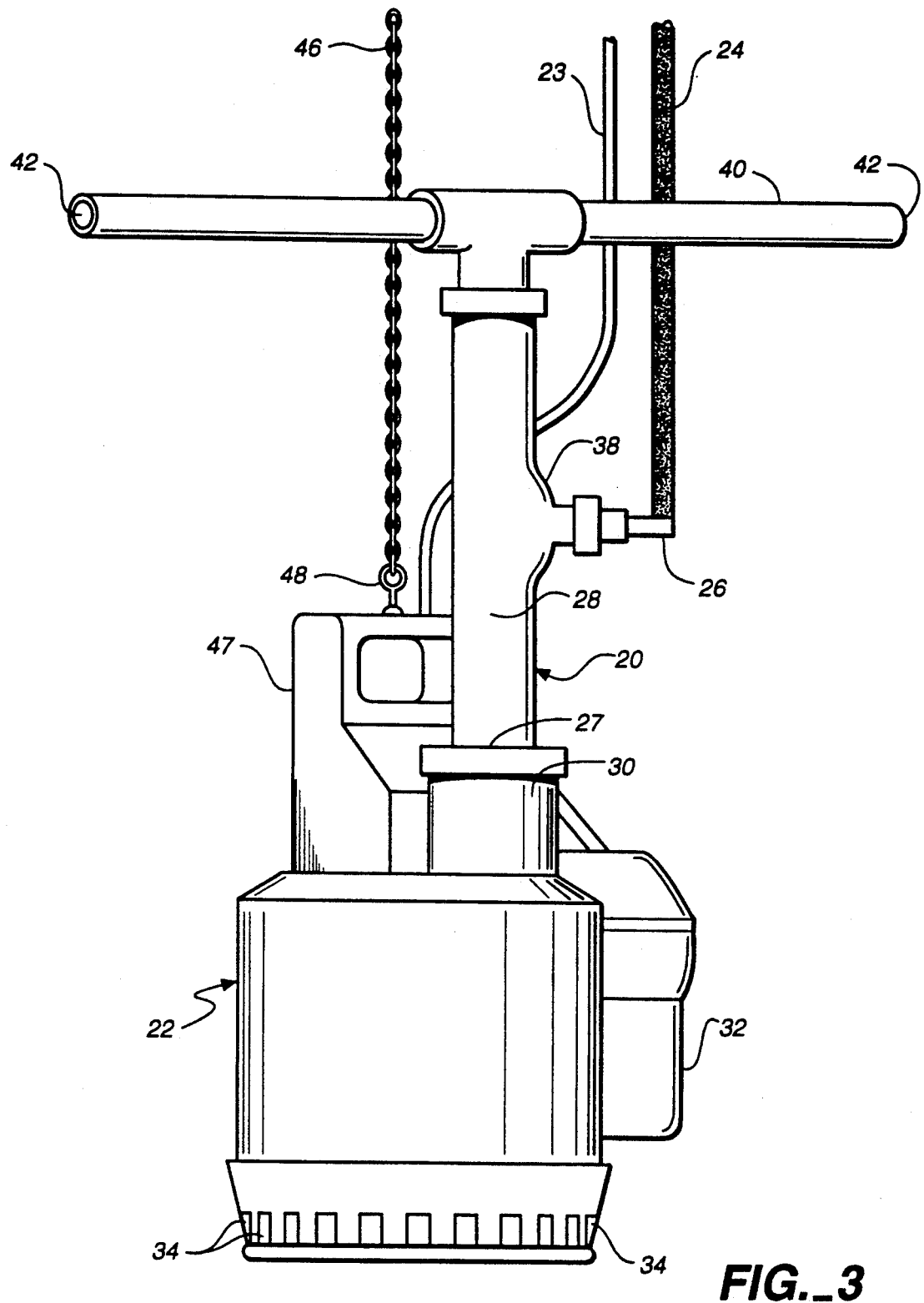
FIG._3

WATER PURIFICATION APPARATUS AND PROCESS UTILIZING OZONE

FIELD OF THE INVENTION

This invention relates generally to the field of treating water with an ozone-containing gas to remove impurities, to improve its color, taste and odor and to otherwise purify the water for drinking purposes. More particularly, the apparatus and process of this invention is directed to purifying water in holding or storage tanks fed from wells, springs, lakes, streams and the like.

BACKGROUND OF THE INVENTION

Water, that essential constituent to human life, must be of sufficient purity and quality to be viable for human consumption. Since all natural waters contain inorganic and organic substances which may be harmful to human consumption, some form of water purification is required to assure that water is of sufficient quality for drinking. Water-treatment systems generally remove the following contaminants: trace organic compounds; substances which produce color, taste and odor; pathogenic bacteria; and suspended materials. In order to meet drinking water standards of the Safe Drinking Water Act, water-treatment plants for municipalities use a combination of both physical and chemical processes. Physical treatment include screening, aeration, flocculation, sedimentation and filtration. Chemical treatment include coagulation, disinfection, oxidation, ozone purification and adsorption. While the foregoing water treatment processes are often necessary to assure a supply of safe drinking water, most of them are unnecessary for the average individual or group of individuals that depend on natural water taken directly from water holding or storage tanks which receive its water from wells, lakes, springs, streams and the like. Such tanks have capacities ranging from 1000 to 100,000 gallons. The holding period in such tanks are usually sufficient to assure that suspended matter can be removed by sedimentation, i.e. allowing the solid particles to settle to the bottom of the tank where they can be periodically removed. Alum can be added to the water to precipitate any suspended contaminants in the tank. The most common methods for assuring the purity of the water in holding or storage tanks is the use of chlorine as a disinfectant. Other methods include prechlorination in order to destroy algae and to oxidize excessive levels of organic contaminants. There is evidence that chlorine has caused the formation of cancer-causing compounds. Prechlorination also has its drawbacks because of the formation of compounds that impart a disagreeable taste to the water.

Until recently, ozone purification was used only by municipal water companies as a primary oxidation, disinfecting and deodorizing media in combination with chlorine as the secondary disinfecting media. Chlorine is required in such systems to assure that bacteria within the municipal water distribution system is killed since ozone reverts to oxygen within minutes after it is added. Ozone has the advantage over chlorine in that it kills bacteria on contact much faster than chlorine and kills viruses on contact that are not affected by chlorine. In addition, ozone kills algae spores, fungus, mold and yeast spores, oxidizes oils and sulfur, and precipitates heavy metals such as iron, aluminum, and manganese. Ozone removes color and odor in water without a residue since oxygen is the by-product of the oxidation reaction.

Since the mid 1980's, ozone generation systems have been used in the treatment of domestic holding tank water. In many rural areas, homeowners are required by insurance companies to maintain an adequate supply of water in holding tanks for use in the event of a fire. Such homeowners have installed ozone generation systems to make their water suitable for drinking. Purification systems currently in use for domestic tank water include an air pump, an ozone generator which is connected to an in-line mixer and which is installed on the feed line from the source to the holding tank; see Triple O Water Treatment System Model TWTS-101 sales brochure. When the water pump is on and is adding water to the holding tank, the air pump pressures air through the ozone generator and then pressures the resulting ozone-containing gas into the in-line mixer which creates ozone-saturated water bubbles. These bubbles are then pressured into a filter module which is hung inside the tank. When the water pump is off, the ozone from the generator is pressured directly to the filter module which is equipped with a diffuser to create ozone-saturated bubbles within the tank.

There is a need for a system for treating domestic holding tank water more efficiently with greater versatility than those systems which use pressure to force the ozone-containing output from the generator into the holding tank water. There is also a need for such a system which enables one to easily vary the position of the ozone-containing output in any position within the tank.

SUMMARY OF THE INVENTION

A system for purifying water comprises a water holding tank having a raw water inlet and a treated water outlet, an ozone generator having an inlet open to the atmosphere and an outlet for generating an ozone-containing gas, a pump having an input and an output, mixer injector means for entraining the ozone-containing gas into a water stream having a suction port in fluid communication with the outlet of the ozone generator and a main pipe having one end connected to the output of the pump and the other end for discharging a water stream entrained with the ozone-containing gas into the holding tank, and means attached to the pump for positioning the pump within the holding tank.

The advantages of the water purification system of the present invention over the systems of the prior art include:

(a) more efficient because the pump-injector means combination is designed to draw by vacuum just the amount of air into the ozone generator for the generation of the volume of ozone that is required to disinfect and odorize the contaminants in the tank; and (b) more rapid adjustment of the position of the ozone-containing gas within the tank to assure the best mixing of the ozone-containing gas in the water and to maintain this mixing above the sediment at the bottom of the tank.

The essential steps of the water purification process include positioning an assembly of pumping and mixer injector means within a water holding tank to provide optimal water purification, pumping water through the pumping means to create a vacuum in the mixer injector means, passing air at atmospheric pressure through an ozone generator to produce an ozone-containing gas stream by means of the suction created in the injector means, entraining the resulting ozone-containing gas stream into water passing through the pump to form ozone-containing bubbles, and diffusing the bubbles into the water in the tank.

BRIEF DESCRIPTION OF THE DRAWINGS

FIG. 1 is a schematic illustration of a water purification system of the present invention;

FIG. 2 is a schematic illustration, partially in cross-section, of another embodiment of the present invention; and FIG. 3 is a schematic illustration of the mixer pump-injector means combination of the present invention.

DETAILED DESCRIPTION OF THE PREFERRED EMBODIMENT

Referring to FIGS. 1 and 3, water holding tank 1 having manhole 3 and vent 5 in its roof 7. Untreated water from a well or other source is fed to tank 1 through inlet pipe 10 and the treated water exits tank 1 through outlet pipe 12. Ozone generator 14 is mounted to sidewall 16 of tank 1. Ozone generator can be either a corona discharge generator or an ultraviolet ozone generator. In the corona discharge generator, such as the ClearWater Tech CD Systems, air is drawn via into the input of generator 14 by means of the vacuum created by venturi-type mixer 20 in combination with submersible pump 22 serviced by electrical power chord 23. The air is exposed to a plurality of high voltage electrical discharges which causes a portion of the 20% oxygen in the air to disassociate and form ozone, $O_3$. The resulting ozone-containing gas comprises ozone and the partially oxygen-depleted air. In the ultraviolet ozone generator, ozone is formed when the air passes the ultraviolet light source. Both generators are equipped with an electrical box (not shown) and a timer (not shown). The ozone-containing gas passes from the ozone generator through line 24, which can preferably be flexible tubing, such as Tygon tubing, to auxiliary pipe 26 of mixer 20. The inlet end 27 of body 28 of mixer 20 is connected to discharge 30 of submersible pump 22. Float 32 is provided to shut off pump 22 in the event tank 1 runs dry. Water enters a plurality of orifices 34 evenly spaced in a ring around pump 22 adjacent the bottom of the pump and discharges through discharge 30 creating a vacuum as it passes through the venturi section 28 within mixer 20. The ozone-containing air stream that is drawn into suction port 26 is mixed with the water and flows to pipe 40 having a plurality of outlet nozzles 42 which serve as diffusers through which the ozonated bubbles of water enter the water stored in tank 1. Additional tees can be mounted to each end of nozzles 42 for improving the diffusing of the bubbles. Submersible pump 22 initially is lowered into place within tank 1 by means of a stainless steel chain 46 or the equivalent connected to handle 47 on pump 22 via eye hook 48. Pump 22 is positioned to be above any sediment at the bottom of tank 1 and remains in this position by chain 46. After pump 22 is in place, chain 46 is removably attached to another eye hook (not shown) adjacent roof 7. Chain 46 is readily available for raising pump 22 from the bottom and removing it from tank 1 for periodic servicing. Chain 46 can also be in combination with a block and pulley arrangement to move the pump 22-mixer 20 combination shown in greater detail in FIG. 2 in the desired lateral position for the best mixing action within tank 1 as described in detail below.

Referring now to FIG. 2, a pair of blocks 52 each housing pulleys 51 are affixed to the opposite sidewalls 50 of holding tank 54 having a minimum diameter of approximately 15 feet by means of turnbuckle 56. A continuous length of stainless steel wire 58 is mounted around pulleys 51. Two equally spaced pump 22-mixer 20 assemblies are shown mounted on wire 58 by chains 46. Each of the pump 22-mixer 20 assemblies is attached to wire 58 and maneuvered laterally along the horizontal axis of tank 54 by drawing wire 58 over pulleys 51 until the assemblies are positioned in the desired location within tank 54. Wire 50 is accessed through manhole 3 which in turn is reached via ladder 60. The number of equally spaced pump 20-mixer assemblies depends on the diameter of the tank and the quality of the water to be treated.

EXAMPLE

A 5000 gallon storage tank was equipped with a 2 inch ID raw water pipe, a 2 inch ID treated water pipe, a 4 inch diameter vent and a 24 inch diameter manhole access in its roof in the manner shown in FIG. 1. A P-2000 Corona Discharge (CD) unit sold by Clearwater Tech having a capacity of generating ozone at a rate of 5.6 grains (0.363 grams) per hour was mounted on the sidewall of the storage tank. A venturi-type differential pressure injector mixer specifically designed for the injection of ozone gas sold under the name "Kynar Mazzei Injector" was used in the water purification system of this example. The Mazzei Injector is manufactured by Mazzei Injector Corporation, which is more completely described in U.S. Pat. No. 4,123,800, which description is incorporated by reference herein. The particular injector used in this example had a suction capacity of up to 27 cubic feet of air per hour and a 1½ inch OD main pipe. A Submersible Sump Pump Model LSP03 manufactured by Goulds having a performance rating of delivering about 1,800 gallons per hour and equipped with a 15 foot power cord was also used in the purification system of this example. The inlet end of the Mazzei Injector was threaded into the 1½ inch ID discharge nipple on the Submersible Sump Pump. A 5/16 inch ID Tygon flexible tubing, which was 15 feet in length, was operably attached between the suction port of the Submersible Sump Pump and the outlet from the CD unit through which the ozone-containing air stream passes. A 1½ inch ID tee was threaded on the discharge end of the Mazzei Injector. On each end of the tee was threaded one end of a one foot length of pipe. In each of the other ends of the one foot pipe was threaded a 1½ inch ID tee (not shown) to serve as a diffuser of the ozone and air-containing water bubbles flowing from the Mazzei Injector. One end of a stainless steel No. 8 single jack and single loop coil chain, which was 8 feet in length was fixedly attached to the handle on the Submersible Sump Pump. The Tygon tubing, power cord and stainless steel chain were gathered together by hand to form a bundle and as the bundle was allowed to slip though the installer's hands, the Mazzei Injector-Submergible Sump Pump assembly was slowly lowered though the manhole of the holding tank until the assembly was within approximately 1 feet from the bottom of the tank. The other end of the stainless steel chain was hooked on a eye hook (not shown). A 3 prong ground 115 volt plug on the power cord of the Pump was placed in a suitable outlet and the Pump was started for a period of time to assure the operator that the position of the Injector-Pump assembly was sufficiently above any sediment in the bottom of the tank. The CD unit was started and allowed to run for 4 hours. After this period, samples of the water from the treated water outlet were analyzed for coliform bacteria and none was detected in comparison to the presence of coliform bacteria before the purification system was in place.

What is claimed is:

1. A water purification system comprising:
   (a) a water holding tank having a raw water inlet and a treated water outlet,
   (b) an ozone generator having an inlet open to the atmosphere and an outlet for generating an ozone-containing gas,
   (c) a pump having an input and an output disposed in said holding tank,
   (d) mixer injector means for entraining the ozone-containing gas into a water stream from said output of said pump, said mixer injector having a suction port in fluid communication with said outlet of ozone generator and a main pipe having one end connected to said output of said pump and the other end for discharging the water stream entrained with the ozone-containing gas into said holding tank, and
   (e) means attached to said pump for positioning said pump within said holding tank.

2. The purification system of claim 1 wherein said means for positioning said pump comprises a chain attached to one end to said pump.

3. The purification system of claim 2 wherein one end of said chain is attached to a wire operably mounted around a pair of pulleys in a block/pulley system mounted in the upper portion of the holding tank for positioning at least one pump mixer injector means combination laterally along the horizontal axis of said tank.

4. The purification system of claim 3 wherein a plurality of pumps-injector means combinations are spaced laterally along the horizontal axis of said tank.

5. The purification system of claim 1 wherein tubing is operably attached between said suction port and said outlet of ozone generator.

6. A process for purifying domestic water within a holding tank comprising:
   (a) positioning at least one assembly of a mixer injector means and pumping means within a water holding tank to provide optimal water purification,
   (b) pumping water through the pumping means to create a vacuum in the mixer injector means,
   (c) passing air at approximately atmospheric pressure through an ozone generator to produce an ozone-containing gas stream by means of the suction created in the mixer injector means,
   (c) entraining the resulting ozone-containing gas stream into the water passing through the pumping means to form ozone-containing bubbles, and
   (d) diffusing said bubbles into the water in said tank.

7. The process of claim 6 wherein said assembly is positioned above the bottom of said holding tank to avoid sedimentation.

8. The process of claim 6 wherein said assembly is positioned along the horizontal axis of said holding tank to provide optimum diffusing of the bubbles with the water.

9. The process of claim 6 wherein at least two assemblies are equally positioned along the horizontal axis of said holding tank to provide optimum diffusing of the bubbles with the water.

* * * * *